(No Model.)

C. HAROLD.
CAR SIGNALING APPARATUS.

No. 545,585. Patented Sept. 3, 1895.

WITNESSES:
Joshua Bergstrom
Fred Acker

INVENTOR
C. Harold
BY
Munn & Co.
ATTORNEYS.

UNITED STATES PATENT OFFICE.

CHARLES HAROLD, OF NEW YORK, N. Y.

CAR SIGNALING APPARATUS.

SPECIFICATION forming part of Letters Patent No. 545,585, dated September 3, 1895.

Application filed December 10, 1894. Serial No. 531,414. (No model.)

*To all whom it may concern:*

Be it known that I, CHARLES HAROLD, of New York city, in the county and State of New York, have invented a new and Improved Signaling Device for Surface Cars, of which the following is a full, clear, and exact description.

My invention relates to a signaling device particularly adapted for use on surface cars, and the object of employing this particular device is to provide against accidents occurring by reason of persons attempting to cross tracks at the back of a moving or a standing car, and, because of no warning of its approach, meeting a car traveling in an opposite direction upon an adjoining track. The device comprises an alarm at the rear of a car, and operating means, as hereinafter described and claimed, for causing the alarm at the rear end of a car to be sounded from the forward portion upon the approach of a car traveling in an opposite direction and which is to pass the car upon which the alarm is rung. In this manner persons leaving a car when it is either stationary or in motion will be warned not to cross an adjoining track immediately because of the approach of another car, and persons crossing the street back of a stationary or moving car will be warned not to proceed farther until the second car which is announced shall have passed.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1:
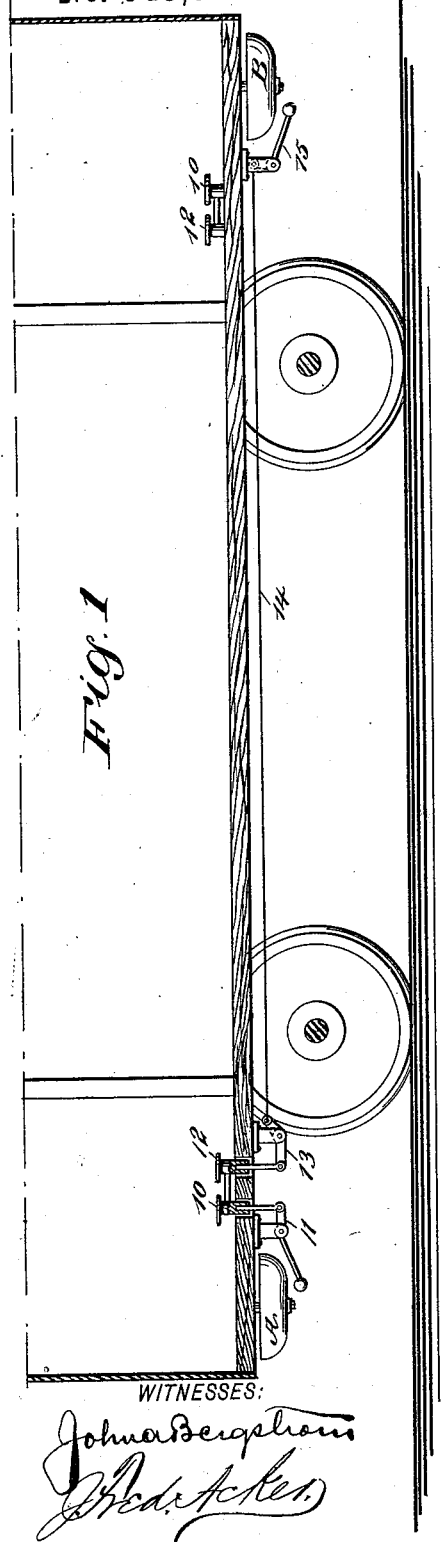
Figure 2:
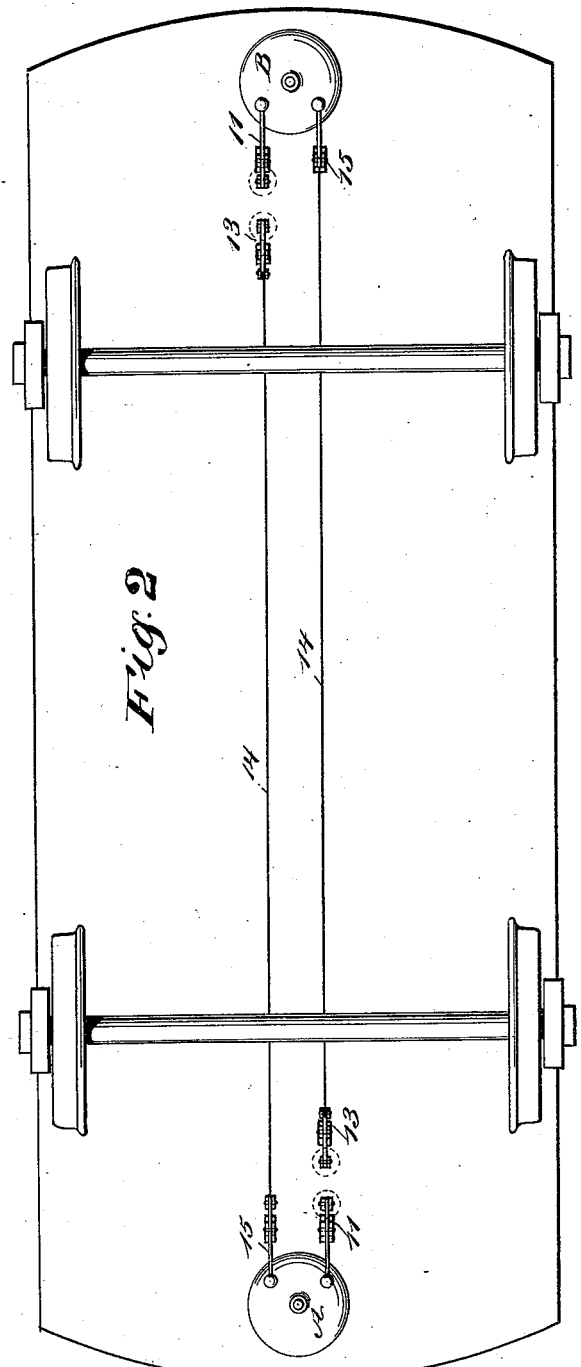

Figure 1 is a longitudinal section through a portion of a car illustrating one means by which the invention may be carried out, and Fig. 2 is a bottom plan view of a car as shown in Fig. 1.

The mechanism shown in the drawings consists in placing at each end of the car an alarm, which is illustrated as in the nature of a gong, the two gongs being indicated as A and B. Upon each car-platform two buttons 10 and 12 are placed, to be pressed by the foot. One of these buttons is connected with a lever 11 or other sounding device and acts directly to strike the bell at the end of the car at which the button is located, while when the opposite button 12 is pressed it actuates a lever 13, which operates a chain or wire 14, and it in its turn actuates a striking-lever 15, operating on the gong at the opposite end of the car. In this manner the motorman or gripman or other person in charge of the car may signal at rear of the car independent of the other signal or gong.

It has been conceded that the majority of accidents on surface railroads occur by persons attempting to cross the track passing at the rear of a car traveling in one direction and meeting a car passing in an opposite direction by reason of not being able to see the latter car and not being warned of its approach, together with persons stepping from a stationary car turning from the car and attempting to cross the adjoining track and in the absence of warning meeting a car approaching from an opposite direction and which it was impossible to see. It is obvious that under the method above mentioned—namely, by causing an alarm to be sounded at the rear end of the car independent of an alarm at the front when one car meets another car passing in a contrary direction—persons will be notified upon leaving a car or passing at the rear of a car that there is danger in proceeding.

I desire it to be distinctly understood that an alarm may be sounded simultaneously both at the front and at the rear of the car and by the same mechanism, having only one button or foot-plate instead of the two buttons 10 and 12, or the said button may be coupled by means of a rod 16, as shown in Fig. 1, or, if found more desirable, the mechanism for sounding the alarm at the front may be independent of that sounding an alarm at the rear, and that any appropriate mechanism, electric or otherwise, may be employed for sounding the alarm.

Having thus described my invention, I claim as new and desire to secure by Letters Patent—

1. The combination of the two alarms located at the ends of the car, and two sounding devices for each alarm, one of the said devices of each alarm being constructed to be operated from the same end of the car that carries the said alarm, and the other device having operative connections extending to the opposite end of the car, substantially as described.

2. The combination, of the two alarms located at the ends of the car, two actuating devices projecting adjacent to each other from each platform of the car, an operative connection from one of the said devices to the alarm at the same end of the car, and an operative connection from the other actuating device to the alarm at the opposite end of the car, substantially as described.

CHARLES HAROLD.

Witnesses:
J. FRED. ACKER,
C. SEDGWICK.